United States Patent
Takeshita

(10) Patent No.: US 7,349,295 B2
(45) Date of Patent: Mar. 25, 2008

(54) OPTICAL HEAD DEVICE

(75) Inventor: Nobuo Takeshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1105 days.

(21) Appl. No.: 10/021,000

(22) Filed: Dec. 19, 2001

(65) Prior Publication Data

US 2002/0196720 A1    Dec. 26, 2002

(30) Foreign Application Priority Data

Jun. 20, 2001  (JP)  ............ P2001-186343
Aug. 23, 2001  (JP)  ............ P2001-252823

(51) Int. Cl.
*G11B 7/09* (2006.01)
(52) U.S. Cl. ............... 369/44.22; 369/44.14; 369/53.19
(58) Field of Classification Search ....... 369/44.12, 369/44.15, 44.27, 44.17, 44.32, 44.21, 53.19, 369/53.12, 269, 244, 44.7, 44.14, 44.11, 44.23, 369/44.25, 44.37, 44.41, 44.33, 53.23, 53.41, 369/90, 44.16, 44.22, 44.18, 369, 244.1; 359/814, 822, 824, 819; 384/107; 310/90
See application file for complete search history.

(56) References Cited

U.S. PATENT DOCUMENTS

| | | | | |
|---|---|---|---|---|
| 4,473,274 A | * | 9/1984 | Yano et al. | 369/44.21 |
| 4,838,649 A | * | 6/1989 | Ichikawa et al. | 369/44.21 |
| 5,062,095 A | * | 10/1991 | Horikawa et al. | 369/44.21 |
| 5,148,420 A | * | 9/1992 | Yamamuro | 369/44.11 |
| 5,319,497 A | * | 6/1994 | Wakabayashi et al. | 359/814 |
| 5,327,417 A | * | 7/1994 | Tanaka et al. | 369/13.28 |
| 5,488,594 A | * | 1/1996 | Kobayashi et al. | 369/44.14 |
| 5,724,324 A | * | 3/1998 | Lee | 369/44.15 |
| 5,732,054 A | | 3/1998 | Marino et al. | 369/44.32 |
| 5,791,785 A | * | 8/1998 | Nose et al. | 384/119 |
| 5,905,255 A | * | 5/1999 | Wakabayashi et al. | 369/44.22 |
| 5,920,437 A | * | 7/1999 | Shirotori | 369/44.14 |
| 5,956,188 A | * | 9/1999 | Lee | 359/822 |
| 6,044,048 A | * | 3/2000 | Oinoue et al. | 369/44.23 |
| 6,091,553 A | | 7/2000 | Song et al. | 359/813 |
| 6,134,058 A | * | 10/2000 | Mohri et al. | 359/824 |
| 6,167,009 A | * | 12/2000 | Nakamura et al. | 369/44.32 |

(Continued)

FOREIGN PATENT DOCUMENTS

JP    62-202625    12/1987

(Continued)

*Primary Examiner*—Hoah T. Nguyen
*Assistant Examiner*—Kim-Kwok Chu
(74) *Attorney, Agent, or Firm*—Birch, Stewart, Kolasch & Birch, LLP

(57) ABSTRACT

A lens holder (101) holds an objective lens (4) and a support shaft (103) is inserted in a bearing hole (101*a*) in the lens holder (101). Light that is emitted from a light source and reflected by an information recording medium enters two light receiving parts, which output currents (121*a*, 121*b*) responsive to the amounts of light received. A controller (109) applies a current (196) based on the difference between the currents (121*a*, 121*b*) to coils (116*a*) in an inclination drive unit (106). By interaction between the coils (116*a*) and magnets (116*b*), the lens holder (101) is turned on a first axis (I) while the light source and other components are secured. Fluids provided in the bearing hole (101*a*) further improve the vibration-resisting properties.

11 Claims, 18 Drawing Sheets

U.S. PATENT DOCUMENTS

| | | |
|---|---|---|
| 6,172,958 B1 * | 1/2001 | Mochizuki et al. ...... 369/44.37 |
| 6,222,687 B1 * | 4/2001 | Nagashima ................. 359/819 |
| 6,282,161 B1 * | 8/2001 | Son et al. ................. 369/53.19 |
| 6,304,526 B1 * | 10/2001 | Nagashima et al. ..... 369/44.23 |
| 6,431,757 B1 * | 8/2002 | Nakazeki et al. ........... 384/107 |
| 6,574,186 B2 * | 6/2003 | Nii et al. .................... 369/269 |
| 6,757,236 B1 * | 6/2004 | Kanada ...................... 369/244 |

FOREIGN PATENT DOCUMENTS

| | | |
|---|---|---|
| JP | 01-263951 | 10/1989 |
| JP | 2000-020986 A | 1/2000 |
| JP | 3059141 | 4/2000 |

* cited by examiner

F I G. 5
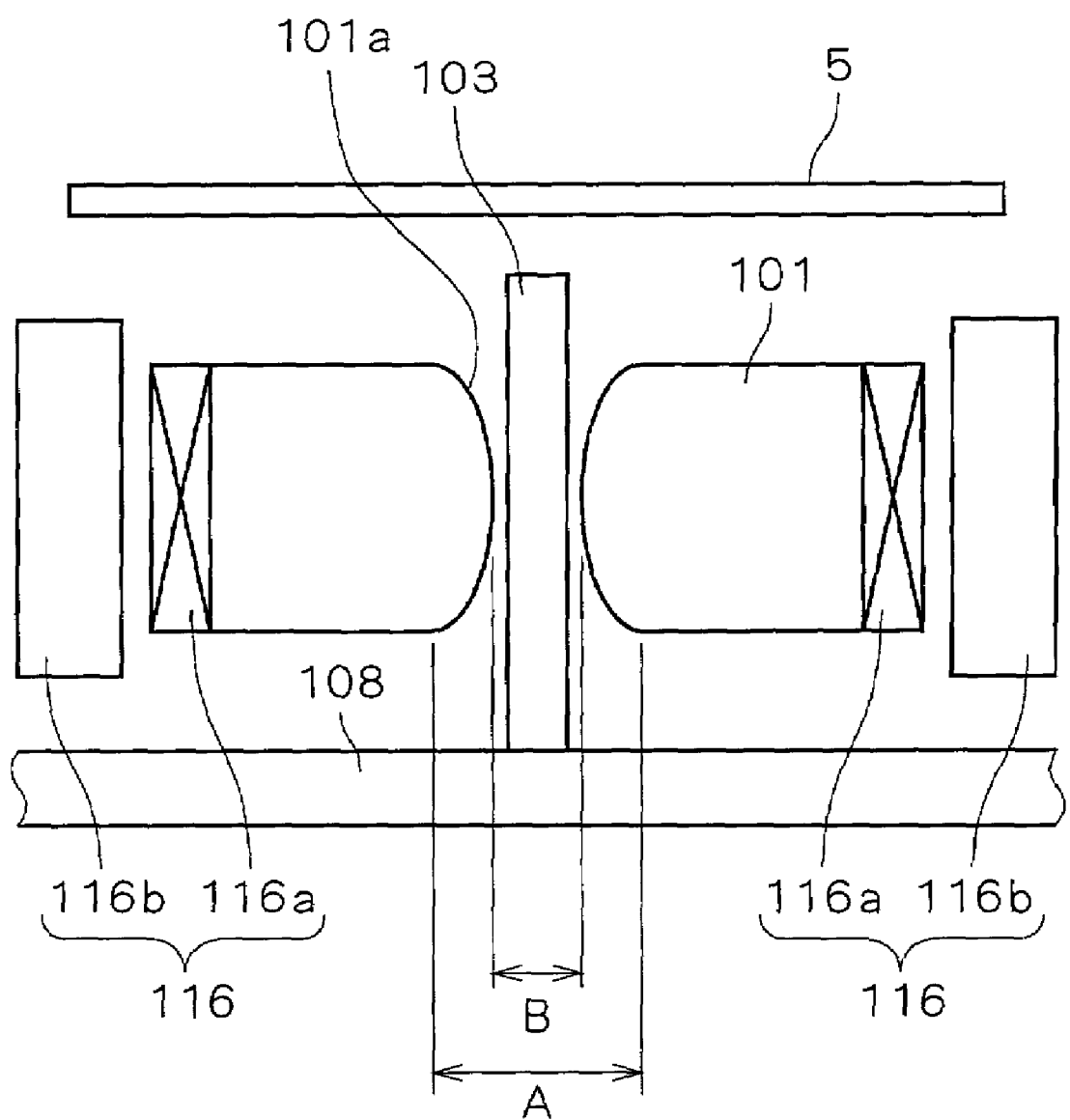

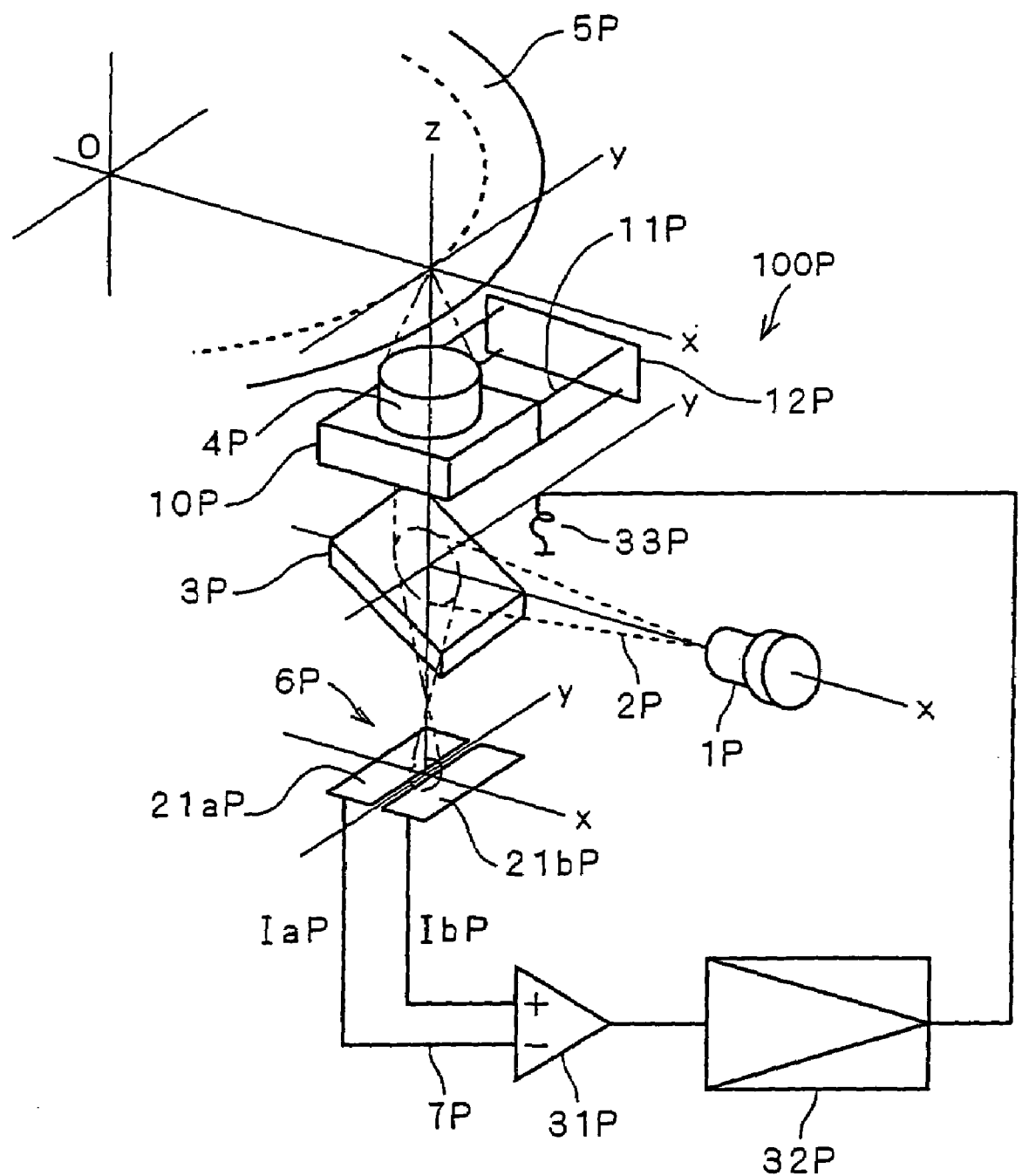
F I G . 16

F I G . 18
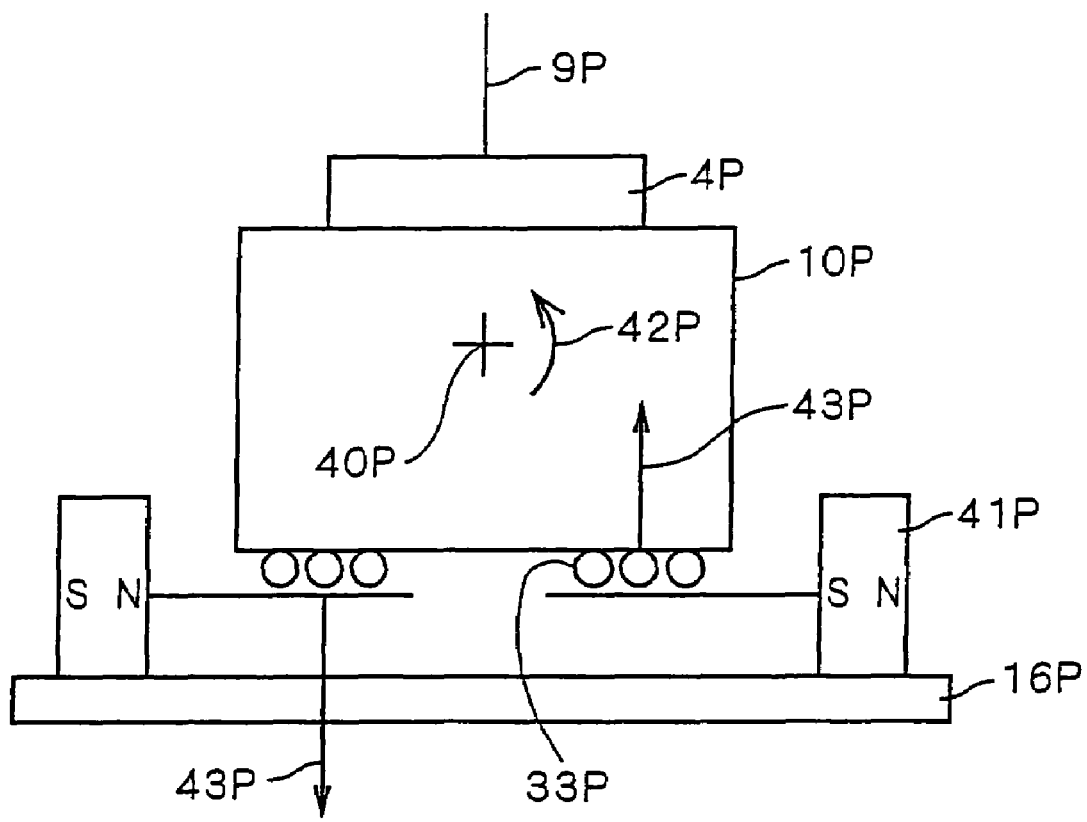

OPTICAL HEAD DEVICE

BACKGROUND OF THE INVENTION

1. Field of the Invention

The present invention relates to an optical head device for optically recording/reproducing information on/from an information recording medium (so-called "optical disc"); more particularly, it relates to a technique for achieving a simplified and miniaturized structure and reduced manufacturing costs of an optical head device that comprises a so-called axial sliding rotating objective lens actuator and a device for correcting the inclination of the optical axis of an objective lens relative to an information recording medium. The present invention also relates to a technique for improving vibration-resisting properties of such an optical head device that comprises an axial sliding rotating objective lens actuator.

2. Description of the Background Art

FIG. 16 is a schematic diagram for explaining a structure of a conventional optical pickup device 100P; FIG. 17 is a schematic diagram for explaining the principle by which the device 100P detects the inclination of an optical disc 5P; and FIG. 18 is a schematic diagram for explaining the principle of electromagnetic drive means for rotatably driving an objective lens 4P in the device 100P. The optical pickup device 100P is disclosed, for example, in Japanese Patent Application Laid-open No. 1-263951 (1989). In this specification, an origin point O is defined on the optical disc 5P, and x, y, and z directions intersecting at right angles at the origin point O are defined.

In the conventional optical pickup device 100P, light 2P emitted from a light source 1P in the x direction is reflected by a half mirror 3P in the z direction and brought by the objective lens 4P into focus on the information recording surface of the optical disc 5P. An optical axis 9P of the objective lens 4P is generally parallel to the z direction. The light 2P is then reflected from the optical disc 5P and passes through the half mirror 3P to enter two photodetectors 21aP and 21bP in a two-segment light detector 6P. The light 2P incident on the photodetectors 21aP and 21bP is converted into an electric signal 7P, which is then used for reproduction of information or for detecting a misalignment between the objective lens 4P and the optical disc 5P.

FIG. 17 illustrates a light intensity distribution 34P when the light 2P enters the objective lens 4P, and a light intensity distribution 35P when the light 2P reflected from the inclined optical disc 5P re-enters the objective lens 4P.

In the conventional optical pickup device 100P, the objective lens 4P is held by a movable part 10P that is supported by four linear, elastic support members (e.g., metal wires) 11P mounted on a fixed member 12P.

The conventional optical pickup device 100P detects and corrects the inclination (inclination angle) of the objective lens 4P relative to the optical disc 5P as follows. First, a current responsive to a difference between outputs IaP and IbP of the photodetectors 21aP and 21bP is applied to a coil 33P, and resultant Lorentz force 43P developed between the coil 33P and magnets 41P mounted on a fixed base 16P generates a turning couple 42P. The turning couple 42P causes the movable part 10P mounting the objective lens 4P thereon to rotate on its center of gravity 40P, whereby the inclination of the objective lens 4P is corrected.

Here, the outputs IaP and IbP of the two photodetectors 21aP and 21bP are differentially computed by an operation unit 31P and applied through a power amplifier 32P to the coil 33P.

In the conventional optical pickup device 100P, as above described, the movable part 10P mounting the objective lens 4P thereon is supported only by the four wires 11P. Thus, when the optical pickup device 100P makes an access to a desired information track on the optical disc 5P, the movable part 10P vibrates widely in the direction of access. The vibrations last long as residual vibrations and it takes time to stop such vibrations. This results in an increase in access time.

Such residual vibrations can be reduced, for example, by using an optical head device comprising a so-called axial sliding rotating objective lens actuator. In the conventional axial sliding rotating method, however, the entire optical head device, including not only the objective lens actuator but also other components such as the light source, the half mirror, and the light detector, is inclined to correct the inclination of the objective lens relative to the optical disc. The above optical head device, therefore, has drawbacks of its complicated, large-scale structure and resultant high manufacturing costs.

In the axial sliding rotating objective lens actuator, both a lens holder and a support shaft inserted in a bearing hole in the lens holder are rigid bodies; therefore, disturbances such as outside vibrations and shocks are likely to be transmitted to the objective lens. From this, the above optical head device has another drawback that its operation is likely to become unstable due to disturbances.

SUMMARY OF THE INVENTION

A first aspect of the present invention is directed to an optical head device comprising: an objective lens for bringing light emitted from a light source into focus on an information recording medium; a lens holder for holding the objective lens, the lens holder having a bearing hole formed along a direction parallel to an optical axis of the objective lens; a support shaft inserted in the bearing hole; a light detector for receiving the light reflected from the information recording medium and outputting information about inclination of the objective lens relative to the information recording medium on the basis of the light received; and an inclination drive unit for, according to the information about the inclination, turning the lens holder on a first axis perpendicular to the support shaft.

According to a second aspect of the present invention, in the optical head device of the first aspect, the bearing hole has a hole diameter that increases as it approaches openings of the bearing hole from the center of the bearing hole, and the bearing hole has a wall that is generally circularly arcuate in cross-sectional shape.

According to a third aspect of the present invention, the optical head device of the second aspect generally satisfies an equation $(A-B)=L \times \tan\theta$, where A is a hole diameter of the bearing hole in the vicinity of the opening, B is a hole diameter of the bearing hole in the vicinity of the center, L is a length of the bearing hole along the optical axis of the objective lens, and $\theta$ is a maximum amount of correction on the turning (inclination) of the lens holder.

According to a fourth aspect of the present invention, in the optical head device of the third aspect, the (A−B) equals approximately to 88 μm and the L equals approximately to 5 mm.

According to a fifth aspect of the present invention, in the optical head device of either of the first through fourth aspects, the inclination drive unit includes: electromagnetic drive means comprising a first element mounted on the lens holder on a second axis perpendicular to both the support shaft and the first axis perpendicular to the support shaft, and a second element located opposite the first element; and a magnetic material fixedly mounted on the lens holder in close vicinity to the second element of the electromagnetic drive means.

According to a sixth aspect of the present invention, the optical head device of either of the first through fifth aspects further comprises: a fluid provided in the bearing hole.

A seventh aspect of the present invention is directed to an optical head device comprising: an objective lens for bringing light emitted from a light source into focus on an information recording medium; a lens holder for holding the objective lens, the lens holder having a bearing hole formed along a direction parallel to an optical axis of the objective lens; a support shaft inserted in the bearing hole; and a fluid provided in the bearing hole.

According to an eighth aspect of the present invention, in the optical head device of either the sixth or seventh aspect, the fluid includes a magnetic fluid.

According to a ninth aspect of the present invention, in the optical head device of the eighth aspect, the lens holder further includes a permanent magnet located opposite the bearing hole and the magnetic fluid.

In the first aspect, the lens holder holding the objective lens can be turned (inclined) thereby to correct the inclination of the objective lens relative to the information recording medium. The optical head device can thus achieve a simplified and miniaturized structure and reduced manufacturing costs, as compared with those in which not only the lens holder but also the light source and other components are inclined as a whole to correct the inclination. In addition, the optical head device, when making an access to a desired information track, is less likely to produce residual vibrations than those which support the objective lens by elastic support members. This reduces the access time.

In the second aspect, even if the lens holder is inclined, a predetermined amount of gap can be ensured between the lens holder and the support shaft in the bearing hole, irrespective of the amount of inclination. The optical head device can thus achieve stable operations irrespective of whether or not the lens holder is inclined.

The third aspect allows easy design of the bearing hole.

In the fourth aspect, the maximum amount of correction on the turning of the lens holder can be set approximately to 1° that is generally deemed necessary.

The fifth aspect can increase a spring constant in the direction of inclination of the lens holder (or turning of the lens holder on the first axis perpendicular to the support shaft) as compared with the case of using no magnetic material. This achieves focusing and tracking control with minimum interference due to the inclination control.

In the sixth aspect, the fluid acting as a damping system allows stable inclination correction, irrespective of disturbances.

The seventh aspect achieves, irrespective of disturbances, the optical head device with good vibration-resisting properties, since the fluid acts as a damping system.

In the eighth aspect, magnetic fields produced by the magnet in the optical head device allows stable holding of the (magnetic) fluid (i.e., they can prevent scattering of the fluid). Thus, damping characteristics of the (magnetic) fluid can be ensured longer than in the case of using non-magnetic fluids, which achieves the high-reliability optical head device.

In the ninth aspect, the permanent magnet allows more stable holding of the (magnetic) fluid, which achieves the higher-reliability optical head device.

An object of the present invention is to provide an optical head device that is less likely to generate residual vibrations and capable of achieving a simplified and miniaturized structure and reduced manufacturing costs, as compared with conventional ones which are wholly inclined to correct the inclination of the objective lens relative to the information recording medium.

Another object of the present invention is to provide an optical head device with good vibration-resisting properties against disturbances.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 9 are schematic diagrams for explaining the operation of the optical head device according to the first preferred embodiment;

FIGS. 16 to 18 are schematic diagrams for explaining a conventional optical pickup device.

DESCRIPTION OF THE PREFERRED EMBODIMENTS

<First Preferred Embodiment>

Figure 1:
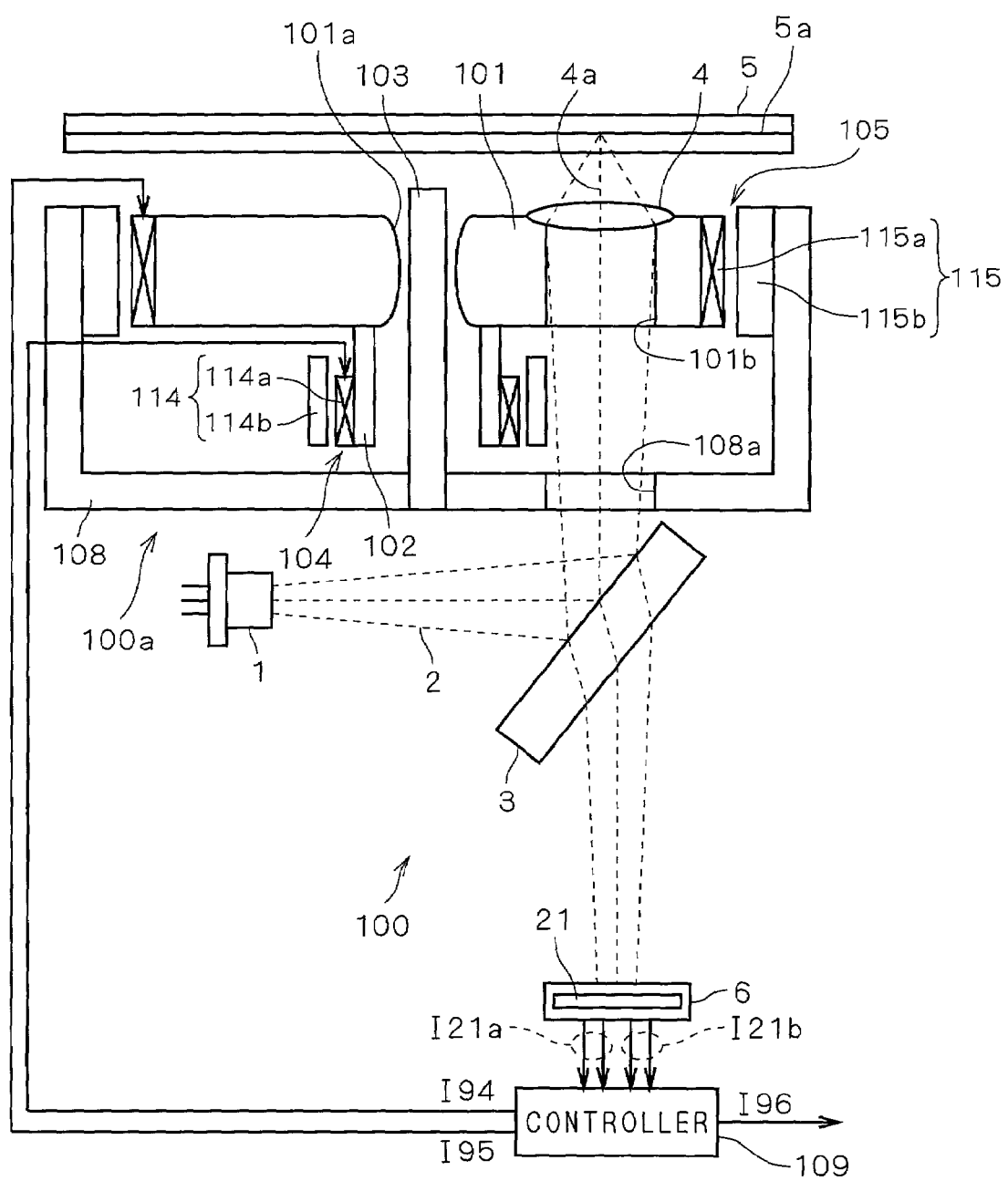
FIG. 1 is a schematic diagram for explaining an optical head device according to a first preferred embodiment.
Figure 2:
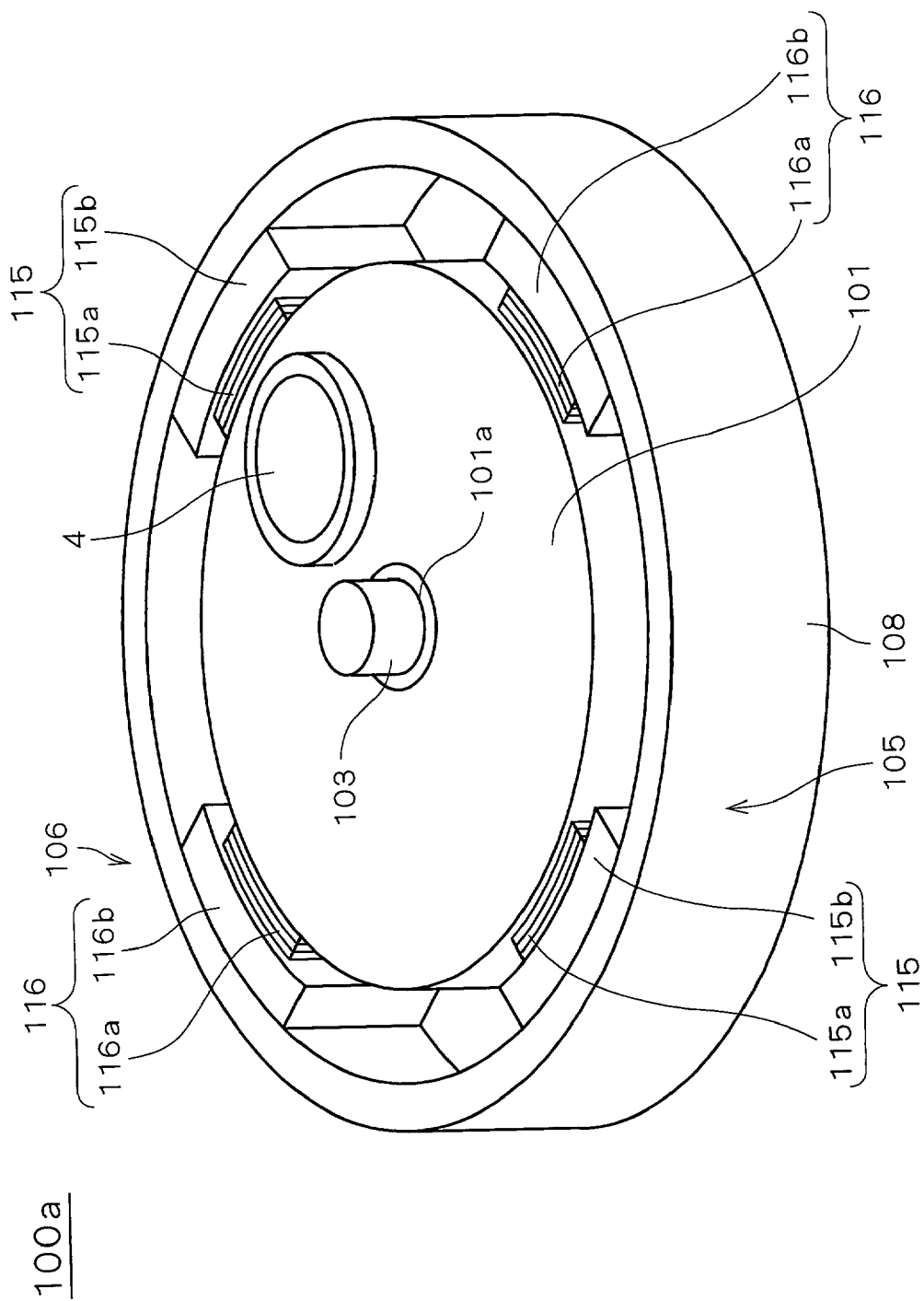
FIG. 2 is a perspective view for explaining an objective lens actuator in the optical head device according to the first preferred embodiment.
Figure 3:
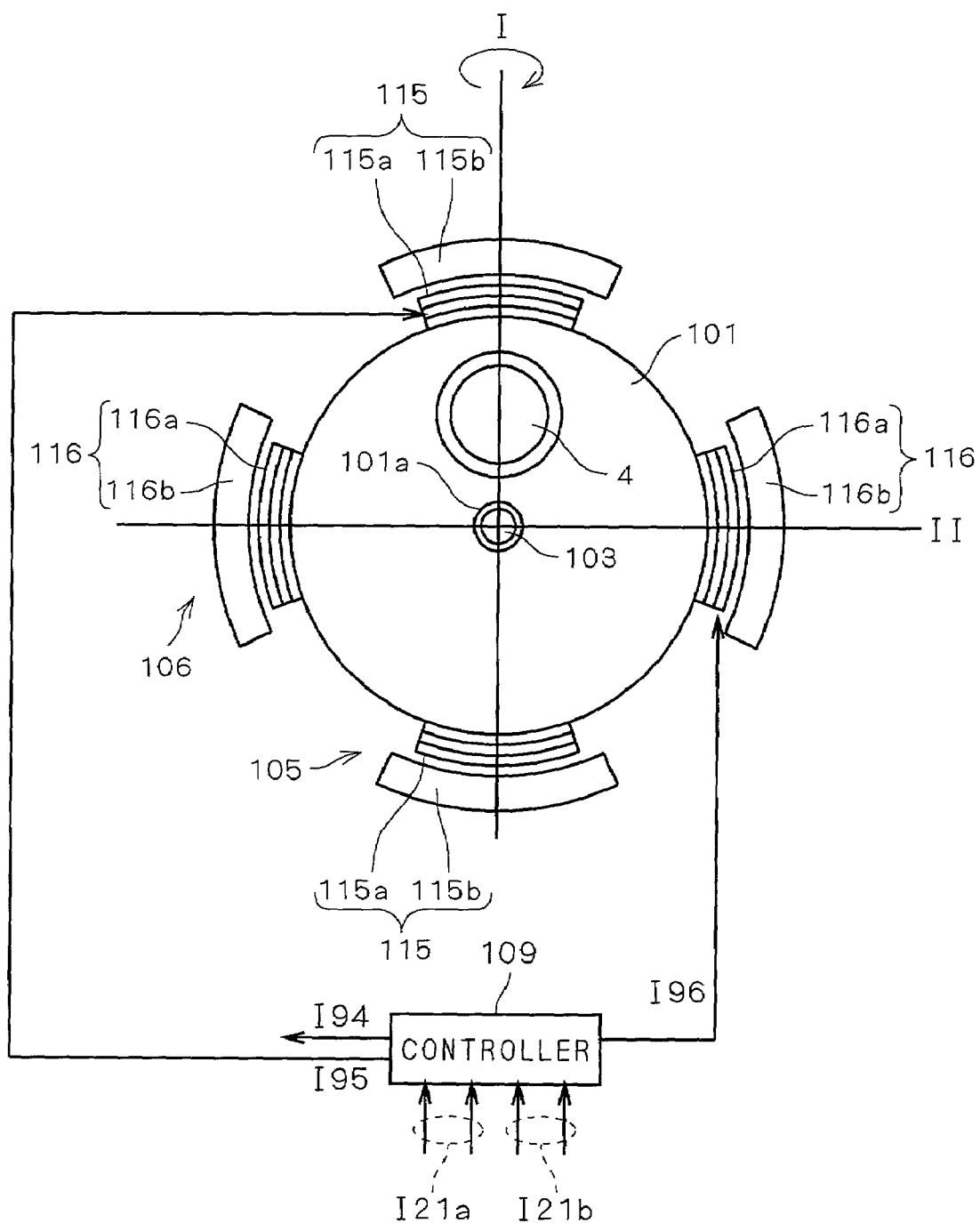
FIG. 3 is a plan view for explaining the objective lens actuator in the optical head device according to the first preferred embodiment.
Figure 4:
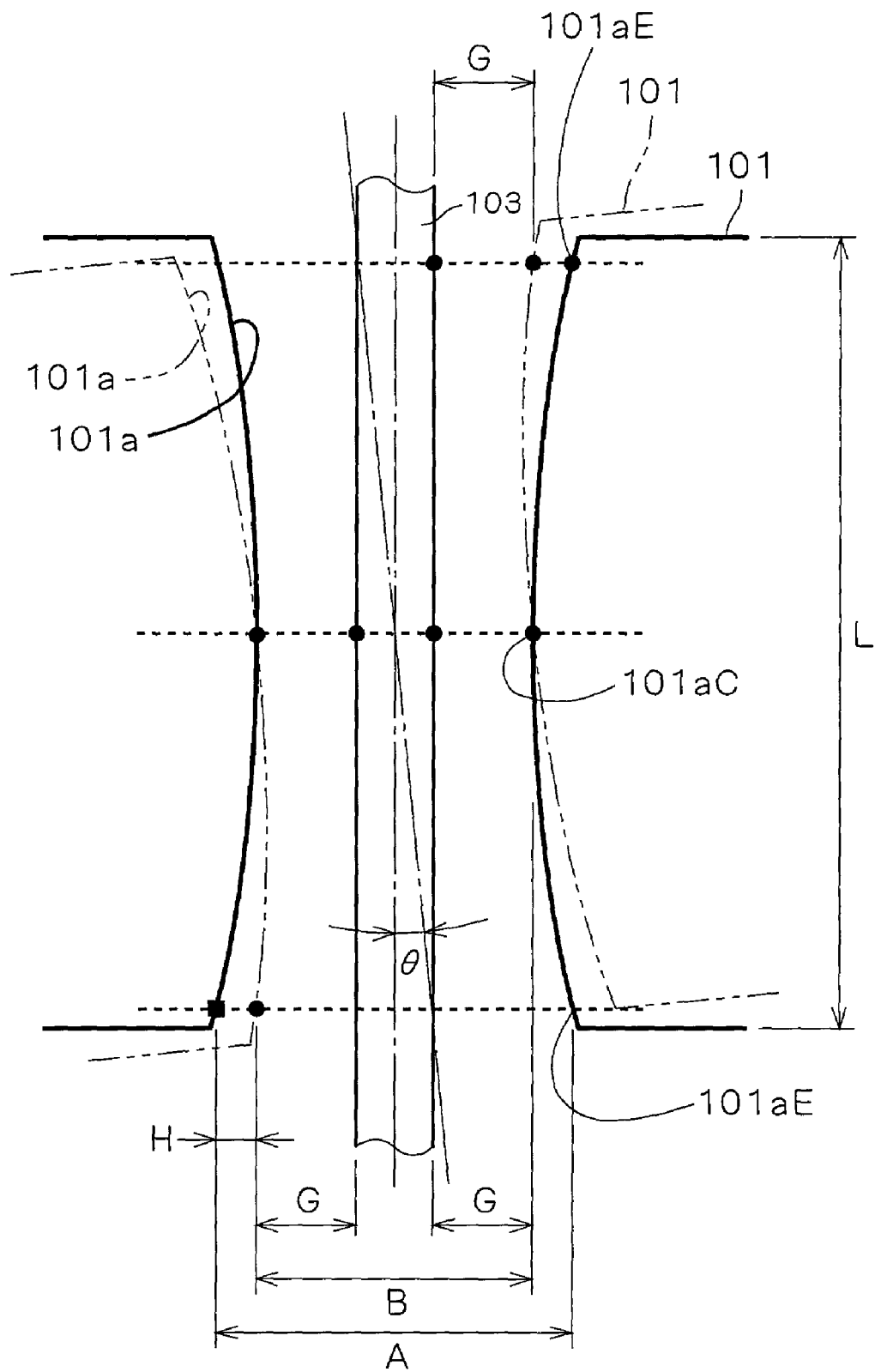
FIG. 4 is a schematic diagram for explaining the optical head device according to the first preferred embodiment.
Figure 6:
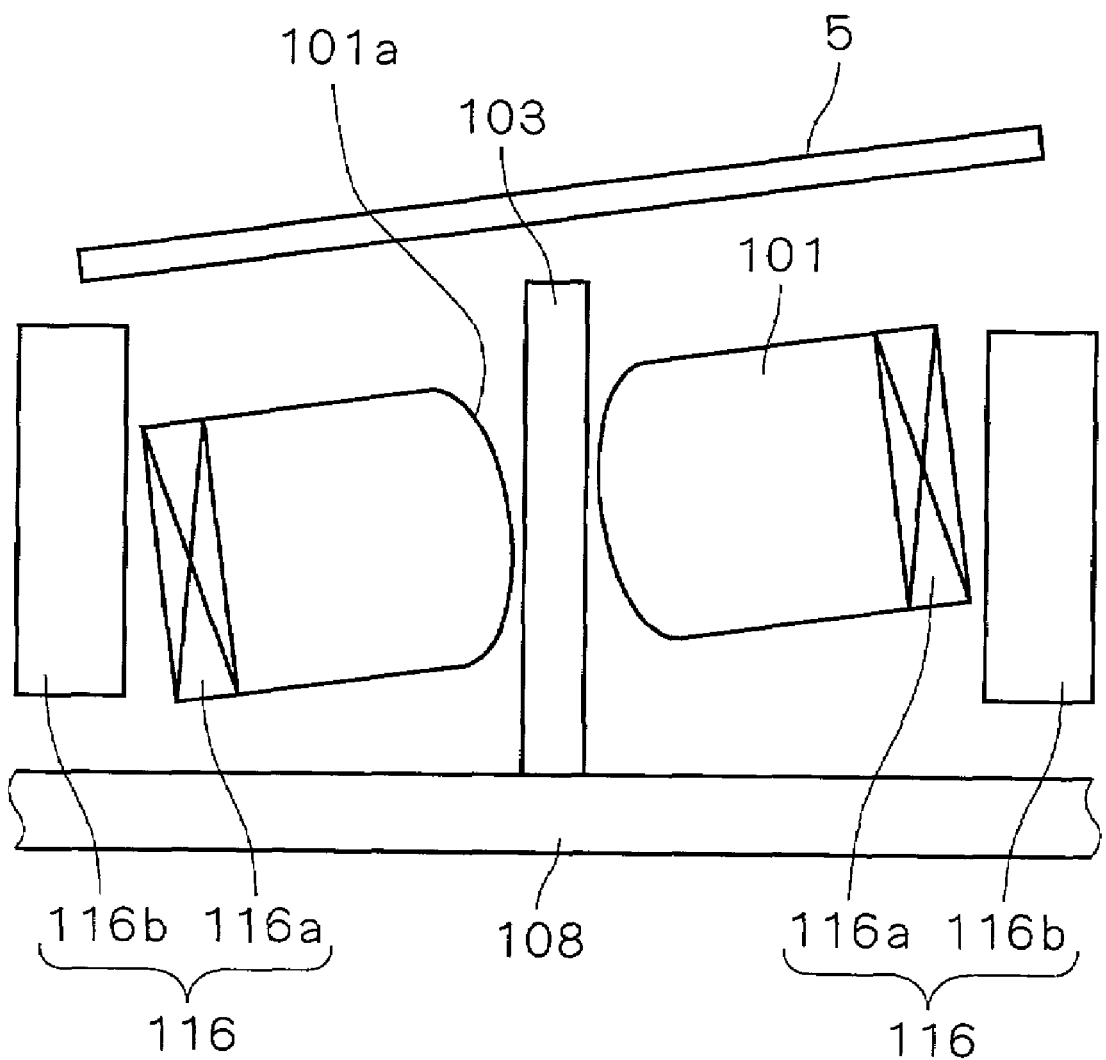
Figure 7:
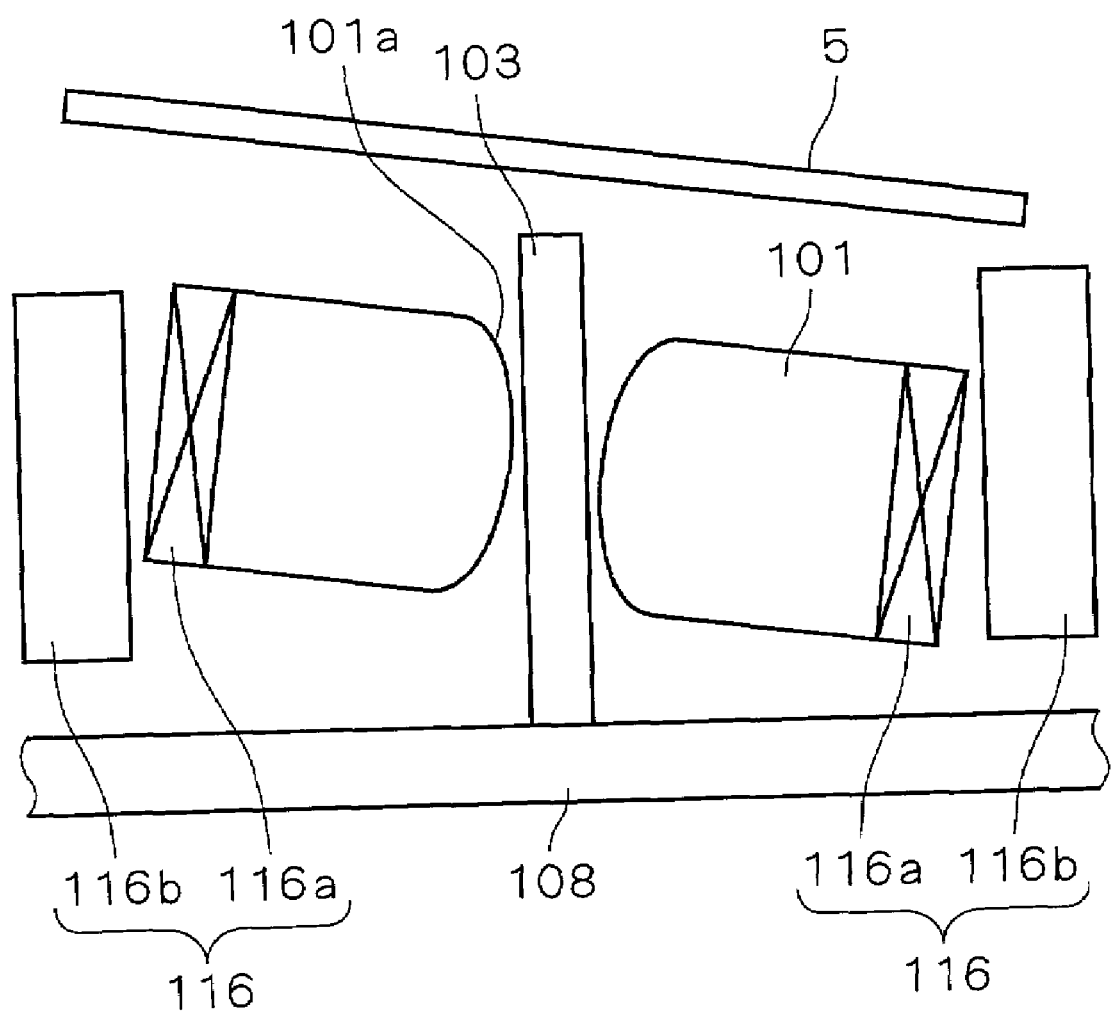
Figure 8:
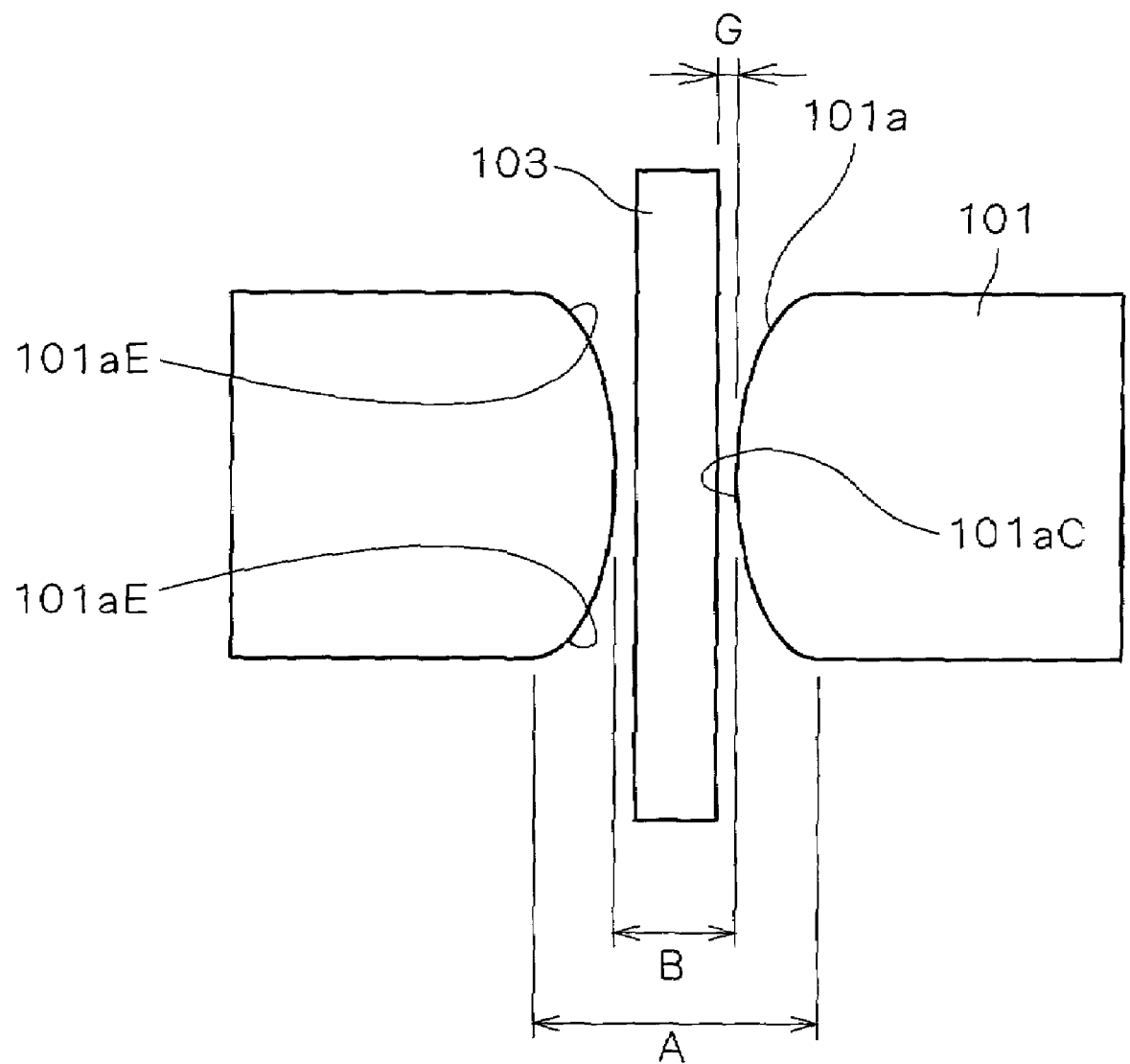
Figure 9:
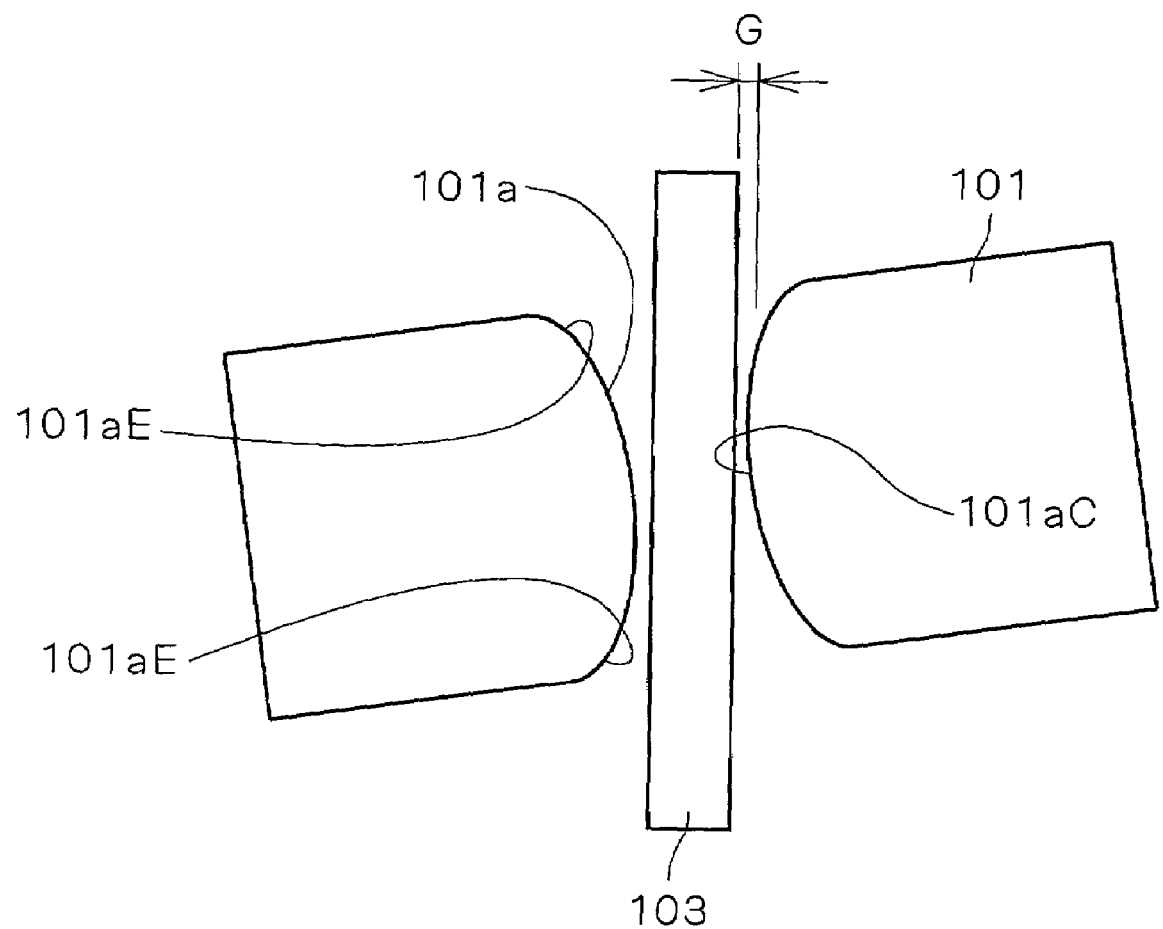

FIG. 1 is a schematic diagram for explaining a general structure of an optical head device 100 according to a first preferred embodiment; FIGS. 2 and 3 are respectively perspective and plan views for explaining an objective lens actuator 100a in the optical head device 100; and FIG. 4 is a partial enlarged view of the optical head device 100. FIGS. 5 to 9 are schematic diagrams for explaining the operation of the optical head device 100; FIG. 8 is an enlarged detail of part of FIG. 5 and FIG. 9 is an enlarged detail of part of FIG. 6. For ease of explanation, FIG. 1 and others also show an information recording medium (so-called optical disc) 5 capable of optically recording information.

The optical head device 100 comprises the objective lens actuator 100a, a light source 1 that emits light 2, a half mirror 3, a light detector 6, and a controller 109.

The objective lens actuator 100a, which is based on an axial sliding rotating method, comprises an objective lens 4, a lens holder 101, a coil mount 102, a support shaft 103, coils 114a, 115a, 116a, permanent magnets 114b, 115b, 116b, and a base 108.

The optical head device 100 further comprises a focusing drive unit 104, a tracking drive unit 105, and an inclination drive unit 106. More specifically, the focusing drive unit 104 includes electromagnetic drive means 114 including the coil 114a and the permanent magnet 114b, and the controller 109. The tracking drive unit 105 includes electromagnetic drive means 115 including the coils 115a and the permanent magnets 115b, and the controller 109. The inclination drive unit 106 includes electromagnetic drive means 116 including the coils (first elements) 116a and the permanent magnets 116b, and the controller 109. The focusing drive unit 104, the tracking drive unit 105, and the inclination drive unit 106 share the controller 109.

In detail, the light source 1, the half mirror 3, and the objective lens 4 are arranged so that the light 2 emitted from the light source 1 is reflected by the half mirror 3 and brought by the objective lens 4 into focus on the information recording medium 5 (more specifically, on a recording surface 5a). The objective lens 4 is held by the lens holder 101.

The lens holder 101 is made, for example, of a cylindrical plastic material and has a bearing hole 101a and a light through hole 101b, both extending between top and bottom surfaces of the cylindrical material. The bearing hole 101a is formed at the center of the cylindrical plastic material. The bearing hole 101a and the light through hole 101b are, for example, circular in the plan view (cf. FIG. 3) and in horizontal cross section. In particular, the hole diameter (or just "diameter") of the bearing hole 101a increases as it approaches openings 101aE of the bearing hole 101a on both sides from the center 101aC of the hole 101a; that is, the wall around the bearing hole 101a is generally circularly arcuate in longitudinal cross section (cf. FIG. 4), which will be described later.

The objective lens 4 is arranged to block one opening of the light through hole 101b closer to the information recording medium 5 and is held by the lens holder 101. Here, the objective lens 4 is located such that its optical axis 4a forms a right angle with the top and bottom surfaces of the cylindrical material, in parallel with the direction in which the bearing hole 101a is formed.

The lens holder 101 is held in the housing type base 108. The bottom surface of the base 108 has built therein the support shaft 103 which is secured to the base 108. The lens holder 101 is held within the base 108 while being supported movably along and rotatably around the support shaft 103 that is inserted in the bearing hole 101a. In the bottom surface of the base 108, a light through hole 108a is formed to face the light through hole 101b in the lens holder 101.

The coil mount 102 in, for example, a cylindrical shape is located on the bottom surface of the lens holder 101 farther from the information recording medium 5. The (cylindrical) coil mount 102 is located to form a continuous hole with the bearing hole 101a in the lens holder 101. The coil 114a is wound on the coil mount 102, with the support shaft 103 as its center. The permanent magnet 114b is located to surround the coil 114a and the coil mount 102.

The cylindrical side surface of the lens holder 101 has two coils 115a mounted thereon. The two coils 115a are opposed to each other in the direction in which the bearing hole 101a and the light through hole 101b (or the objective lens 4) are arranged, with those holes 101a and 101b sandwiched in between. The direction of the arrangement of the bearing hole 101a and the light through hole 101b (or the objective lens 4) is determined to be orthogonal (perpendicular) to the support shaft 103 (or the axis of the support shaft 103) and is hereinafter referred to as a first axis (first axial direction) I. While not shown for avoiding the complexity of the drawings, the two coils 115a are connected in series. The permanent magnets 115b are mounted on the base 108 to face their corresponding coils 115a.

Particularly in the optical head device 100, two coils 116a are mounted on the cylindrical side surface of the lens holder 101 to be opposed to each other with the bearing hole 101a sandwiched in between. The two coils 116a are arranged on a second axis (second axial direction) II that is orthogonal (perpendicular) to both the support shaft 103 and the first axis I orthogonal to the support shaft 103. While not shown for avoiding the complexity of the drawings, the two coils 116a are connected in series. The permanent magnets 116b are mounted on the base 108 to face their corresponding coils 116a.

The light detector 6 includes a photodetector (so-called four-segment photodetector) 21 having a 2 by 2 matrix of four-divided light receiving surfaces and is located to receive at its photodetector 21 the light 2 that has been reflected from the information recording medium 5 and passed through the objective lens 4 and the half mirror 3. The 2 by 2 matrix of four light receiving surfaces are arranged so that each receives an equal amount of light when the objective lens 4 is not inclined with respect to the information recording medium 5, i.e., when the optical axis 4a of the objective lens 4 is generally orthogonal to the recording surface 5a of the information recording medium 5. The four light receiving surfaces each output a current responsive to the amount of light received.

In this specification, the four light receiving surfaces are divided into two groups and each group is referred to as a light receiving part. These two light receiving parts are arranged in the same direction as the arrangement of the two coils 116a and the two permanent magnets 116b, i.e., in the second axial direction II (in FIG. 1, they are arranged in a direction perpendicular to the plane of the drawing). Further, a sum of the currents outputted from the two light receiving surfaces of each light receiving part is referred to as I21a or I21b.

The controller 109 receives output currents from the four light receiving surfaces and outputs currents I94, I95, and I96 based on those four currents. More specifically, the controller 109 outputs the current I94 to the coil 114a in the focusing drive unit 104, the current I95 to the coils 115a in the tracking drive unit 105, and the current I96 to the coils 116a in the inclination drive unit 106.

Next, the operation of the optical head device 100 will be set forth. The light 2 emitted from the light source 1 is reflected by the half mirror 3, passes through the light through holes 108a and 101b in the base 108 and in the lens holder 101, and is brought by the objective lens 4 into focus on the recording surface 5a of the information recording medium 5. The light 2 is then reflected from the information recording medium 5 and passes through the objective lens 4 and the half mirror 3 to enter the photodetector 21 in the light detector 6. The four light receiving surfaces of the photodetector 21 output currents responsive to the light 2 received. Those four currents are used as signals for reproducing/recording information or for detecting a misalignment and an error in the inclination angle of the objective lens 4 relative to the information recording medium 5.

More specifically, the controller 109 computes the output currents from the four light receiving surfaces of the light detector 6, thereby to detect, by using well-known techniques such as astigmatism or a push-pull method, a misalignment of the objective lens 4 relative to the information recording medium 5 in the direction of focusing (in the axial direction of the support shaft 103) and a misalignment of the same relative to a desired track in the direction of tracking (the second axial direction II). In the case of correcting a misalignment in the direction of focusing, the controller 109 applies the current I94 to the coil 114a in the focusing drive unit 104. This induces an electromagnetic force between the coil 114a and the permanent magnet 114b in the focusing drive unit 104 and thereby moves the lens holder 101 in the direction of focusing. In the case of correcting a misalignment in the direction of tracking, the controller 109 applies the current I95 to the coils 115a in the tracking drive unit 105. This induces electromagnetic forces between the coils 115a and the permanent magnets 115b in the tracking drive unit 105 and thereby rotates the bearing hole 101a in the lens holder 101 on the central axis; accordingly, a misalignment in the direction of tracking is corrected. The magnitudes and directions of the currents I94 and I95 applied to the coils 114a and 115b are determined by the controller 109 according to the amounts of misalignment.

When the objective lens 4 is not inclined with respect to the information recording medium 5 (cf. FIGS. 5 and 8), the two light receiving parts of the photodetector 21 receive the same amount of light 2 reflected from the information recording medium 5. The output currents I21a and I21b from the two light receiving parts, therefore, become nearly equal. In this case, the controller 109 judges that the objective lens 4 is not inclined with respect to the information recording medium 5 and thus does not output the current I96.

On the other hand, when the objective lens 4 is inclined with respect to the information recording medium 5, i.e., when the optical axis 4a of the objective lens 4 is not orthogonal to the recording surface 5a of the information recording medium 5, the light 2 reflected from the information recording medium 5 travels angularly relative to the optical axis 4a of the objective lens 4 and re-enters the objective lens 4 toward the light detector 6. At this time, the intensity distribution of the reflected light re-entering the objective lens 4 deviates from a normal distribution and consequently, one of the two light receiving parts of the photodetector 21 receives a greater amount of light than the other. Accordingly, the output current I21a or I21b from the above one of the light receiving parts becomes larger than that from the other. Now, if the above direction in which the objective lens 4 is inclined with respect to the information recording medium 5 is reversed, the output current I21b or I21a from the above other of the light receiving parts becomes larger than that from the above one. In either case, a difference between the currents I21a and I21b increases with increasing amounts of inclination (turning).

In this fashion, information (including the presence or absence, direction and magnitude of the inclination) on the objective lens 4 relative to the information recording medium 5 can be obtained from the difference between the output currents I21a and I21b from the two light receiving parts. For this, the light detector 6 outputs, from four currents, the currents I21a and I21b that give the above information about inclination.

Upon detecting the inclination of the objective lens 4 relative to the information recording medium 5 from the difference between the currents I21a and I21b, or in other words on the basis of the above information about inclination, the controller 109 applies the current I96 to the coils 116a in the inclination drive unit 106. This induces electromagnetic forces between the coils 116a and the permanent magnets 116b in the inclination drive unit 106 and thereby turns (or inclines/rotates) the lens holder 101 on the first axis I. Inclining the lens holder 101 in this way corrects the inclination of the objective lens 4 and makes the optical axis 4a of the objective lens 4 orthogonal to the recording surface 5a of the information recording medium 5 (cf. FIGS. 6, 7, and 9).

At this time, the lens holder 101 can be inclined in the direction to correct the inclination of the objective lens 4 relative to the information recording medium 5 by adjusting settings such as the shape of the coils 116a, the polarity of the permanent magnets 116b, and the direction of the current I96. The controller 109 also controls the amount of turning of the lens holder 101 by controlling the amplitude of the current I96 applied to the coils 116a.

The controller 109 is configured to include, for example, the differential operation unit 31P and the amplifier 32P in the conventional optical pickup device 100P (cf. FIG. 16) or to include a microcomputer, for generating and outputting the current I96. While in the optical head device 100, the focusing drive unit 104, the tracking drive unit 105, and the inclination drive unit 106 share the controller 109, each may have an individual controller.

The optical head device 100 can incline only the lens holder 101 while fixing other components such as the light source 101, for correcting the inclination of the objective lens 4 relative to the information recording medium 5. This achieves a simplified and miniaturized structure and reduced manufacturing costs of the optical head device 100, as compared with conventional techniques in which the entire optical head device, including not only the lens holder 101 but also other components such as the light source 1, is inclined to correct the above inclination.

In addition, the optical head device 100, when making an access to a desired information track, is less likely to produce residual vibrations than the conventional optical pickup device 100P in FIG. 16 which supports the objective lens 4P by the elastic support members (wires) 11P. This reduces the access time as compared with the conventional optical pickup device 100P.

Further as above described, the hole diameter of the bearing hole 101a in the lens holder 101 increases as it approaches the openings 101aE of the bearing hole 101a on both sides from the center 101aC of the hole 101a and thus, the wall around the bearing hole 101a is generally circularly arcuate in longitudinal cross section. From this, even if the lens holder 101 is inclined as illustrated by two-dot chain lines in FIG. 4 as a result of the inclination correction, a predetermined amount of gap G can be ensured between the lens holder 101 and the support shaft 103 in the bearing hole 101a, irrespective of the amount of turning of the lens holder 101. This stabilizes the operation of the optical head device 101 with a minimum amount of variations in operating characteristics due to the presence or absence of the inclination of the lens holder 101.

As illustrated in FIG. 4, for example, where A is the hole diameter of the bearing hole 101a in the vicinity of the openings 101aE, B (<A) is the hole diameter of the bearing hole 101a in the vicinity of the center 101aC, H(=(A−B)/2) is the difference in the radius of the bearing hole 101a between in the vicinity of the openings 101aE and in the vicinity of the center 101aC, L is the length of the bearing hole 101a along the optical axis 4a of the objective lens 4 (cf. FIG. 1), and θ is the maximum amount of correction on the turning of the lens holder 101, the optical head device 101 generally satisfies the following equation:

$$H/(L/2)=\tan \theta, \quad (1)$$

that is, $$(A-B)=L \times \tan \theta \quad (2)$$

The inclination θ of the lens holder 101 is also regarded as the inclination of the optical axis 4a of the objective lens 4.

Substituting well-used design values for optical head devices, e.g., L=5 mm, G=5 µm, and θ=1°, into the above equation (1) or (2) yields the radius difference (H) of about 44 µm, or in other words the hole diameter difference (A–B) of about 88 µm. In this way, the use of the equation (1) or (2) permits easy design of the bearing hole 101a. The lens holder 101 having such concrete design values can be manufactured by plastic molding, in which case it is possible to extract a mold pin for the bearing hole 101a.

Figure 10:
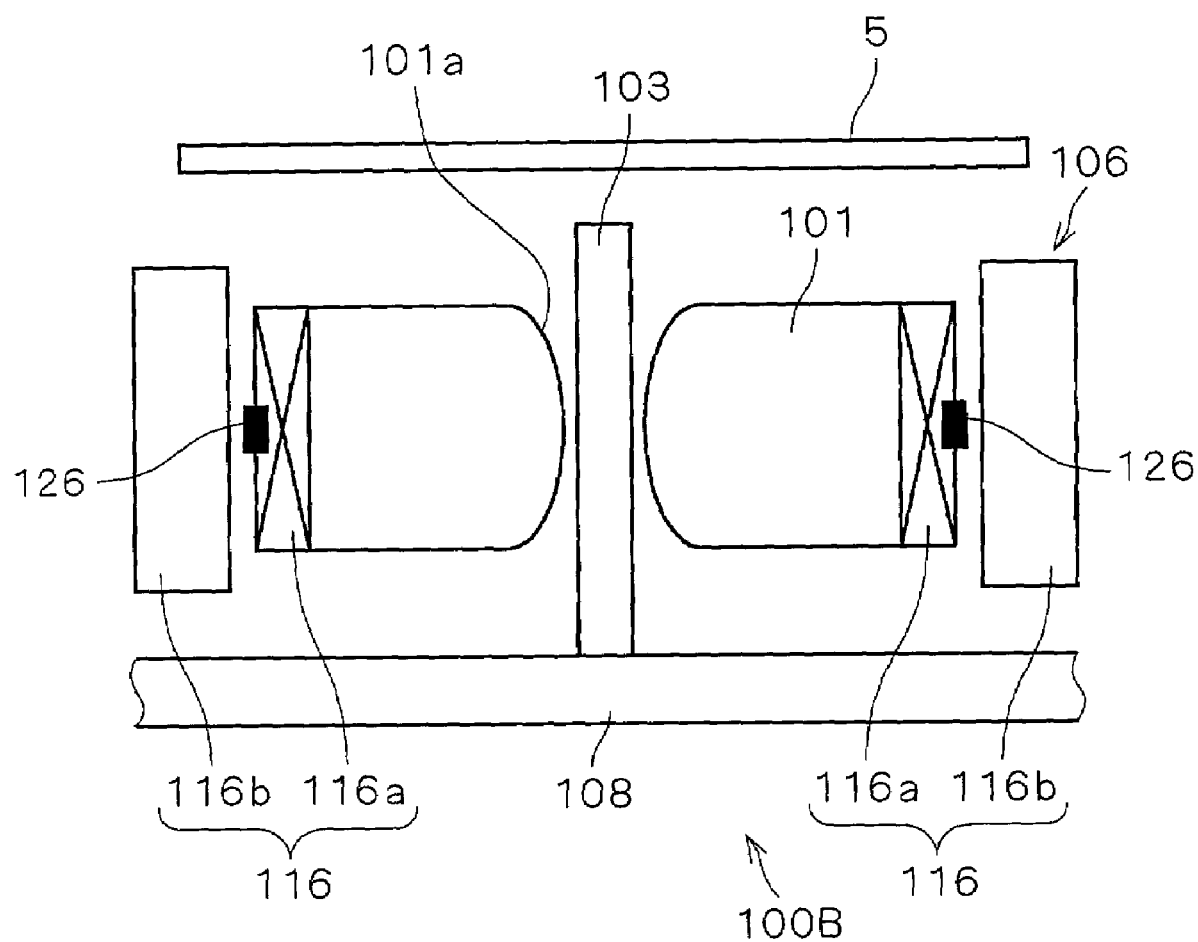
FIG. 10 is a schematic diagram for explaining another optical head device according to the first preferred embodiment.

Now, magnetic materials 126 may be added to the inclination drive unit 106 as in an optical head device 100B illustrated in the schematic diagram of FIG. 10. The magnetic materials 126 that is made, for example of iron, nickel, or stainless steel, are fixedly mounted on the lens holder 101 in close vicinity to and with clearance from the permanent magnets 116b in the inclination drive unit 106. Otherwise, the optical head device 100B is identical in configuration to the aforementioned optical head device 100.

Because of the attractive forces between the magnetic materials 126 and the permanent magnets 116b, the optical head device 100B, as compared with the optical head device 100, can increase a spring constant in the direction of inclination of the lens holder 101 (or turning thereof on the first axis); in other words, it can suppress instability of electromagnetic effects between the coils 116a and the permanent magnets 116b. This achieves focusing and tracking control with minimum interference due to the inclination control by the inclination drive unit 106, and more specifically with minimum deviations of the lens holder 101 due to the outwardly expanding openings 101aE of the bearing hole 101a.

It should be noted that in the inclination drive unit 106, the coils 116a and the permanent magnets 116b may change their places. The same can be said of the coils 114a and the permanent magnets 114b in the focusing drive unit 104 and the coils 115a and the permanent magnets 115b in the tracking drive unit 105. Further, electromagnets may be used instead of using the permanent magnets 116b, 114b, and 115b.

<Second Preferred Embodiment>

Figure 11:
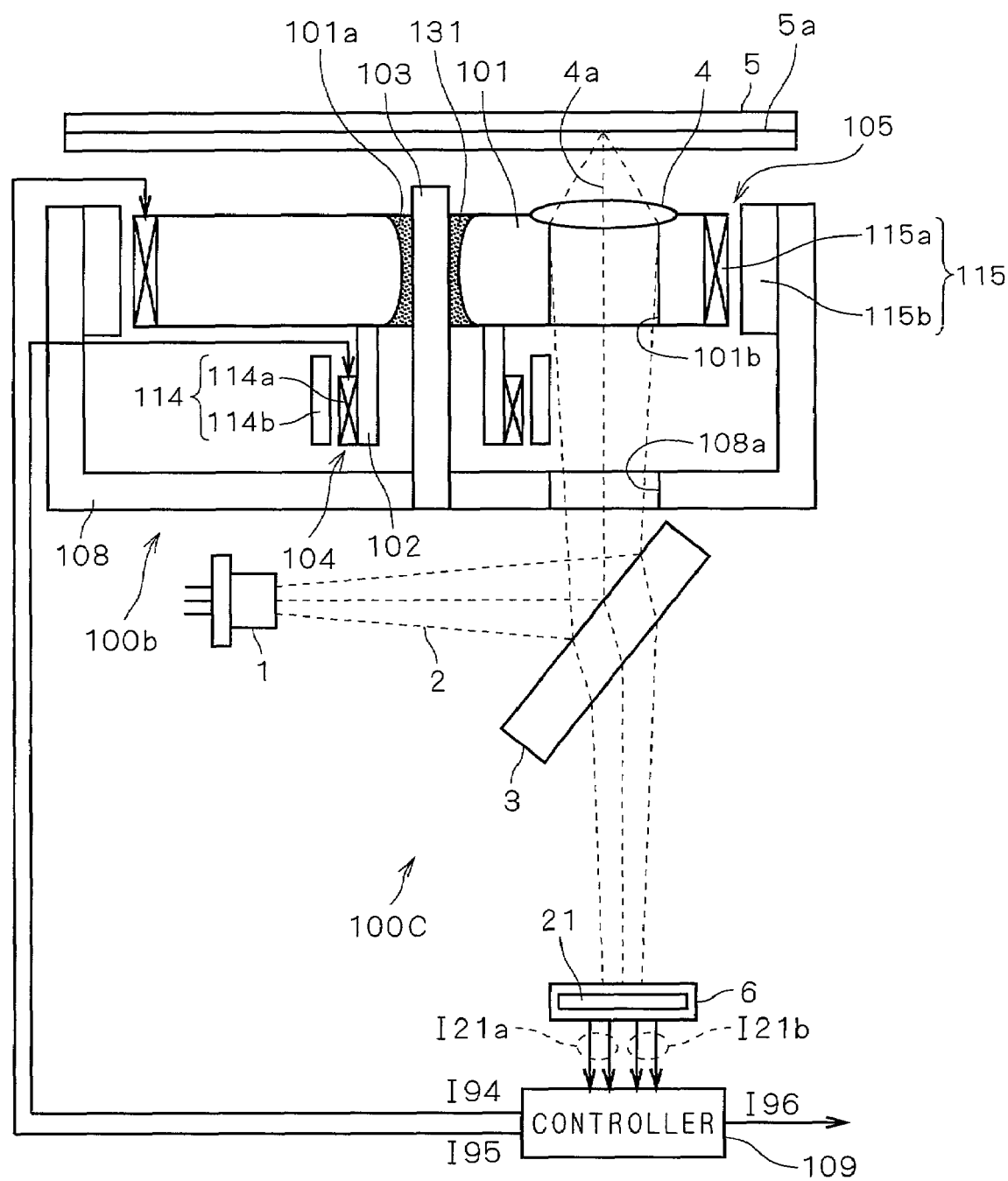
FIGS. 11 and 12 are schematic diagrams for explaining an optical head device according to a second preferred embodiment.
Figure 12:
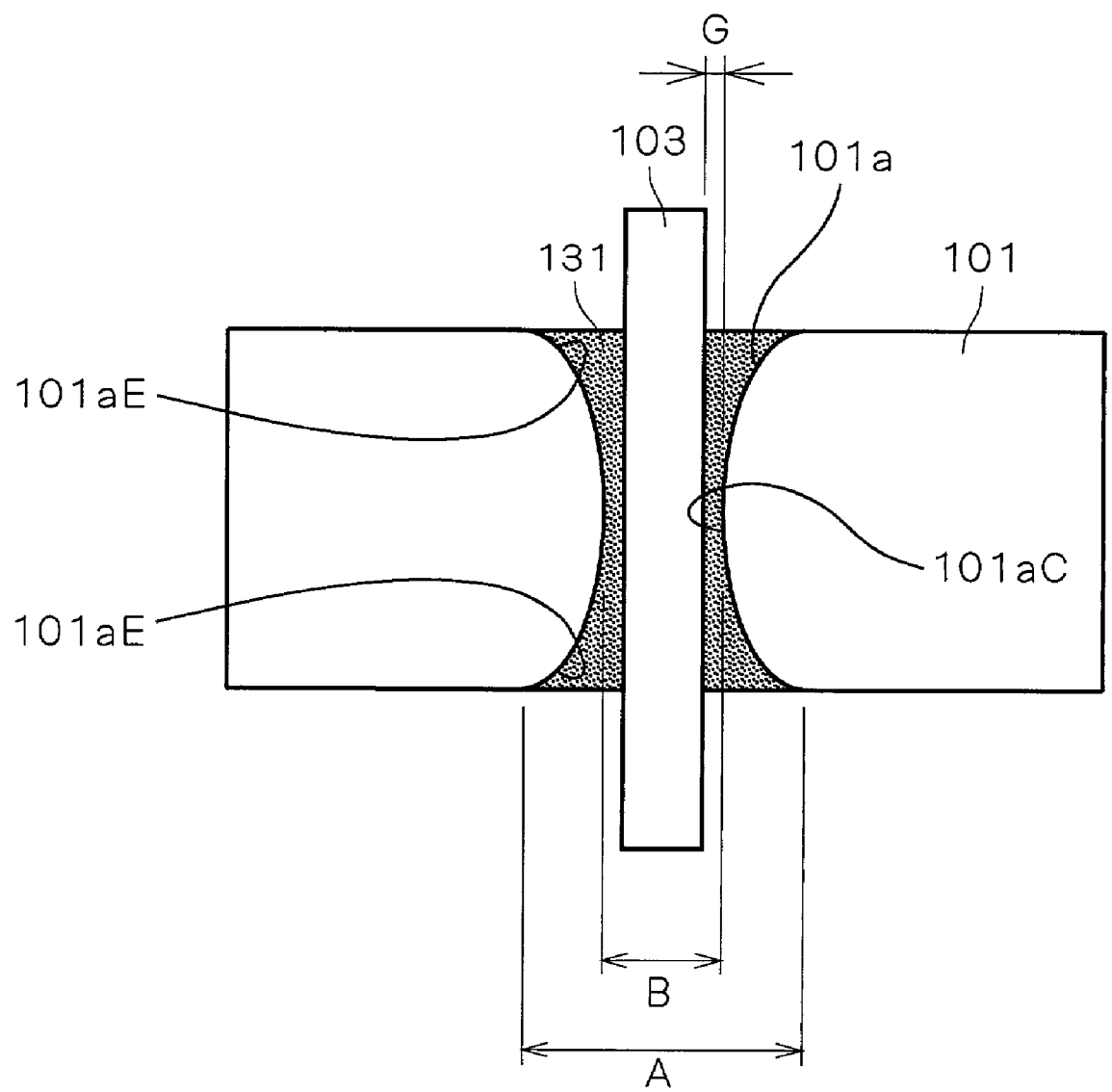

FIG. 11 is a schematic diagram for explaining a general structure of an optical head device 100C according to a second preferred embodiment, and FIG. 12 is a partial enlarged view of the optical head device 100C. The optical head device 100C (or an objective lens actuator 100b) further comprises fluids 131, besides the components of the aforementioned optical head device 100 (or the objective lens actuator 100a) (cf. FIG. 1). The fluids 131 are provided in the bearing hole 101a, and more specifically in a gap (bearing gap) between the wall around the bearing hole 101a and the support shaft 103. The fluids 131 may be various fluids such as lubricating oil and magnetic fluids, but preferably nonvolatile fluids.

Disturbances such as outside vibrations and shocks act upon the optical head device 100C and are transmitted to the base 108 and the support shaft 103 which are rigidly connected to each other. However, because the fluids 131 act as damping systems or buffer materials, such disturbances are hardly transmitted from the support shaft 103 to the lens holder 101. The optical head device 100C can thus achieve stable focusing, tracking, and inclination control (correction) with a minimum control error due to disturbances. That is, the optical head device 100C has good vibration-resisting properties.

Especially the optical head device 100C which also performs inclination control, can prevent the instability of the orientation (inclination) of the lens holder 101 due to disturbances by the damping effect of the fluids 131. This achieves focusing and tracking control with minimum interference due to the inclination control by the inclination drive unit 106, and more specifically with minimum deviations of the lens holder 101 due to the outwardly expanding openings 101aE of the bearing hole 101a.

The fluids 131 further avoid the necessity of applying a coating or the like to the support shaft 103 and the bearing hole 101a in order to improve their sliding characteristics.

Figure 13:
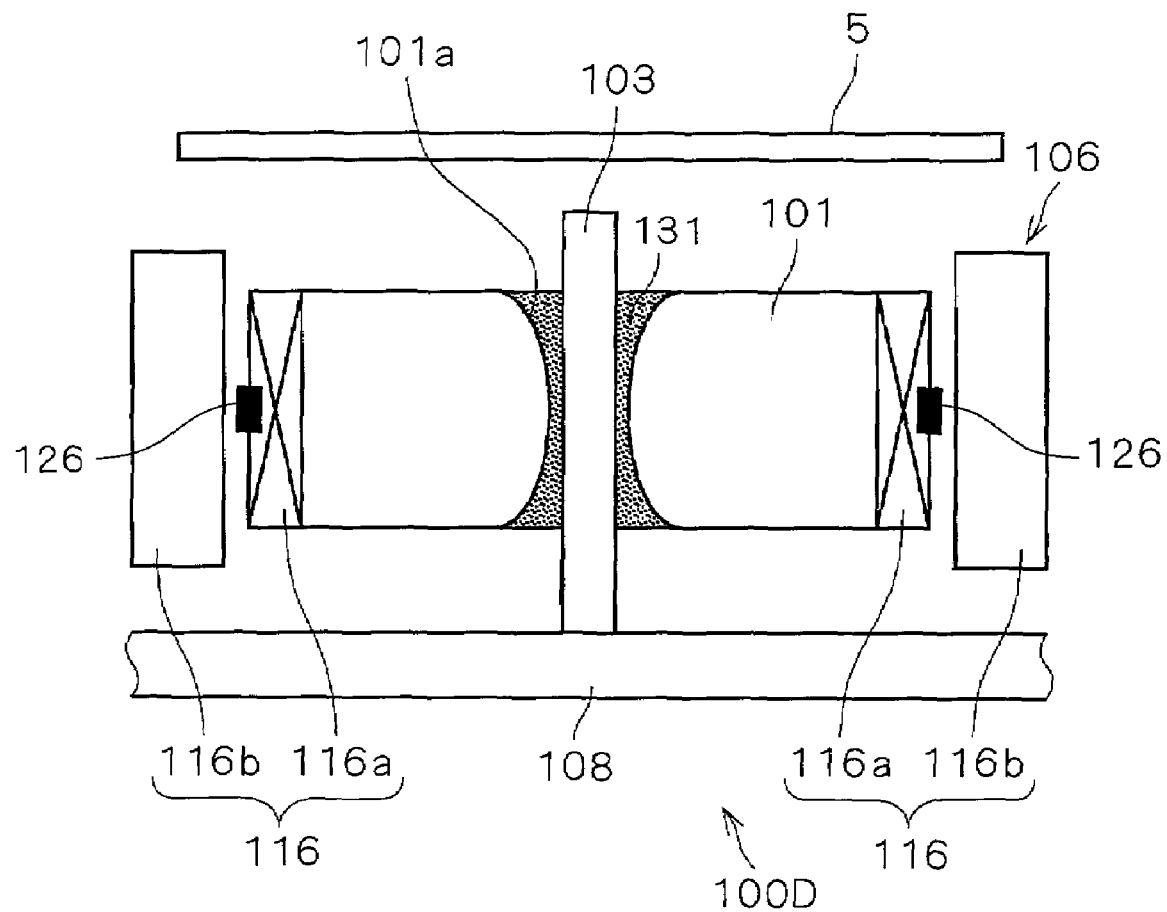
FIG. 13 is a schematic diagram for explaining another optical head device according to the second preferred embodiment.

As in an optical head device 100D illustrated in the schematic diagram of FIG. 13, the fluids 131 may be provided in the bearing hole 101a in the previously described optical head device 100B (cf. FIG. 10).

Now, the Japanese Patent No. 3059141 has disclosed a pickup actuator having magnetic fluids. In this pickup actuator, however, the magnetic fluids are provided in a magnetic circuit portion (e.g., on a magnet which faces a focusing coil) and therefore, they are different in position from the fluids 131 in the optical head device 100C.

In the magnetic circuit portion of the above pickup actuator, a coil is provided between the magnet and a yoke and thus, a magnetic gap therebetween is relatively large. For a coil wound with four coils of 0.1 mm diameter, for example, the magnetic gap is about 1 mm in consideration of a margin for operation and variations during assembly. In the optical head device 100C, on the other hand, the bearing gap between the wall around the bearing hole 101a and the support shaft 103 is in the range from about several micrometers to about several tens of micrometers. In regard to cost or price, also, the optical head device 100C is less expensive than the above pickup actuator which, in order to fill the magnetic gap, requires a great amount of magnetic fluids that are relatively expensive materials. Further, the optical head device 100C can prevent scattering of the fluids 131 by capillary action resulting from a small amount of gap.

The Japanese Patent Application Laid-open No. 62-202625 (1987) has disclosed an axial sliding rotating objective lens actuator having magnetic particles (powders). In this objective lens actuator, magnetic particles are provided in a bearing portion. However, since the magnetic particles are basically solid matter, they do not act as buffer materials against vibration transmission and external vibrations are transmitted. In addition, the magnetic particles will scatter with age since the capillary action of fluids is not produced only from solid matter.

<Third Preferred Embodiment>

Figure 14:
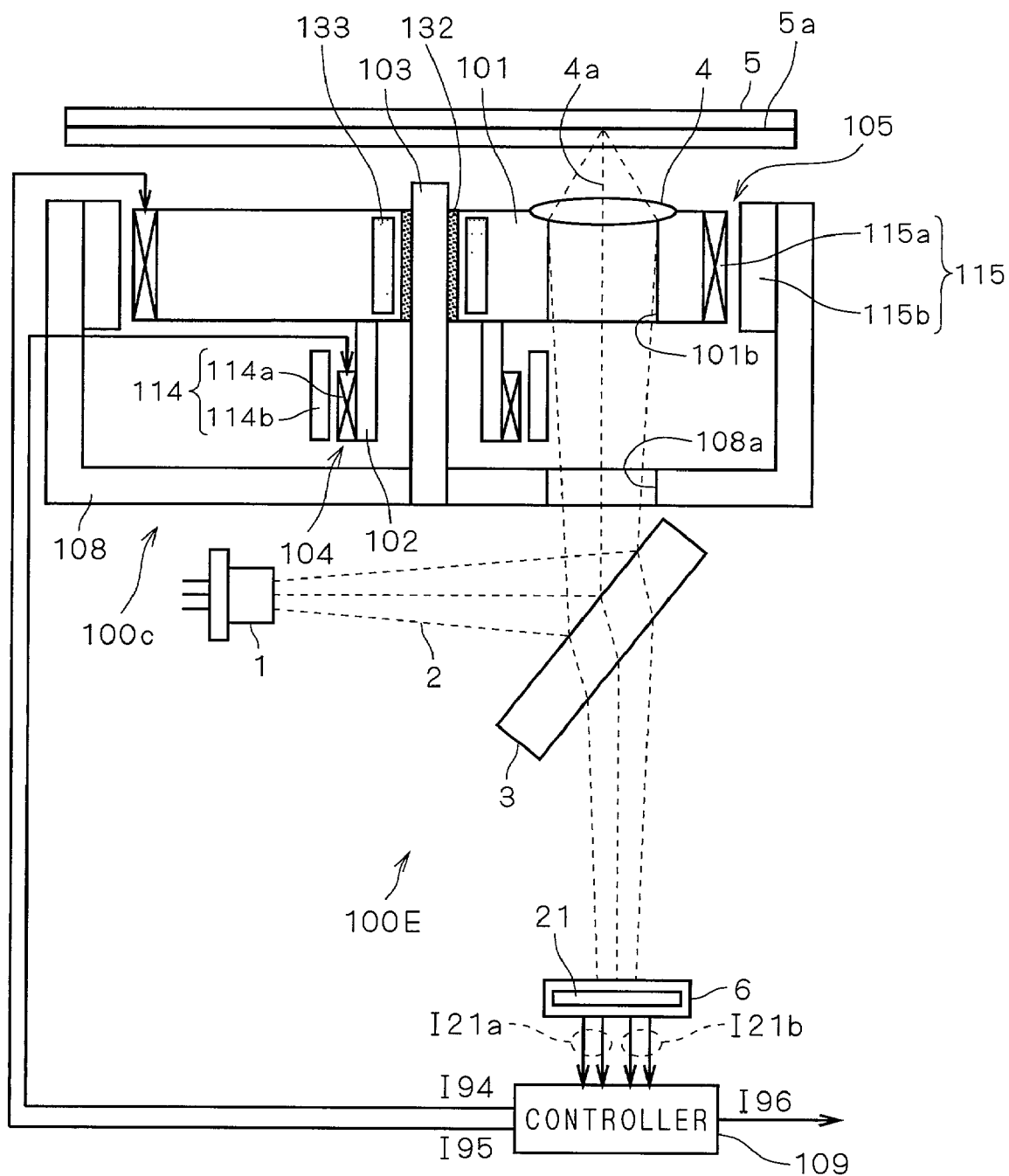
FIGS. 14 and 15 are schematic diagrams for explaining an optical head device according to a third preferred embodiment.
Figure 15:
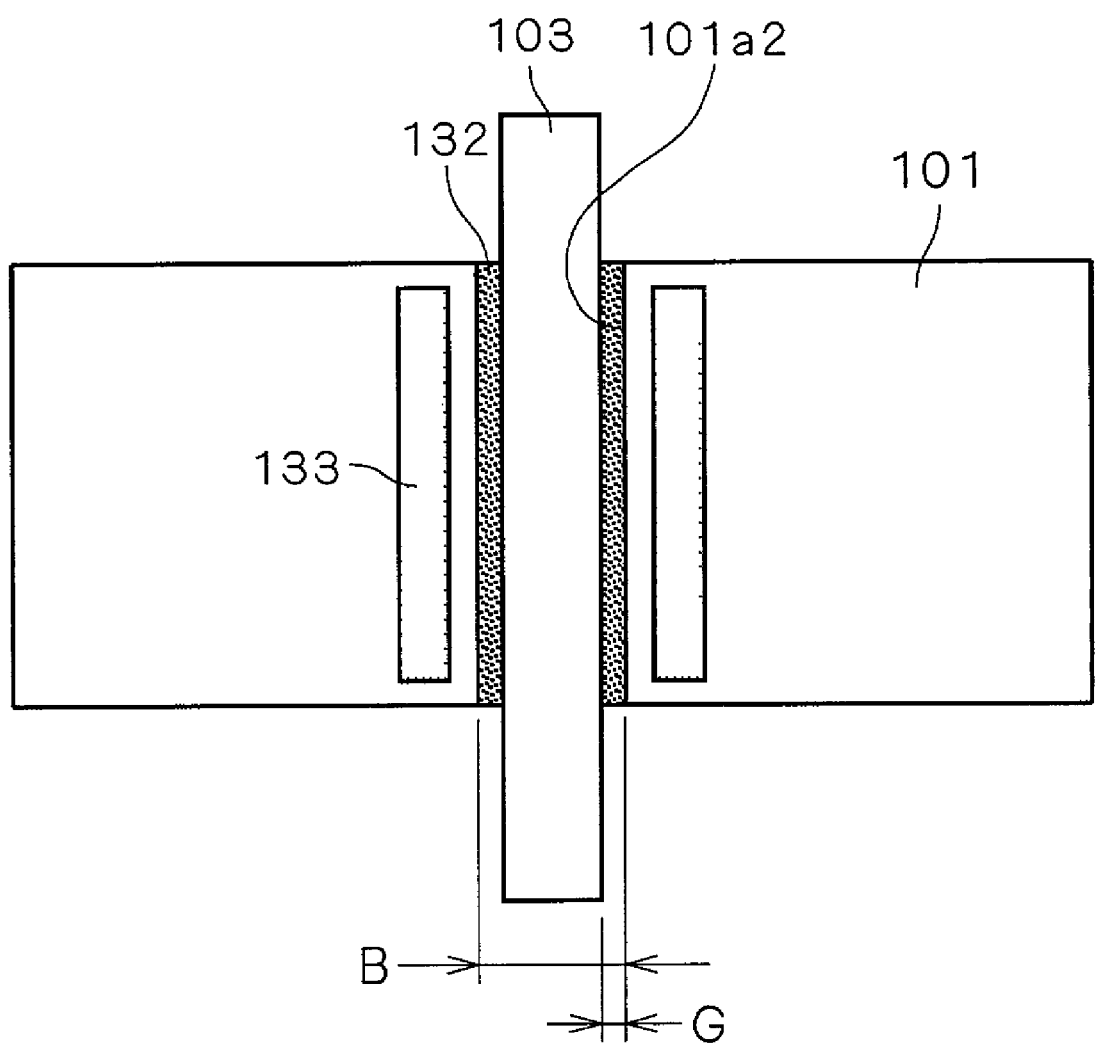
Figure 17:
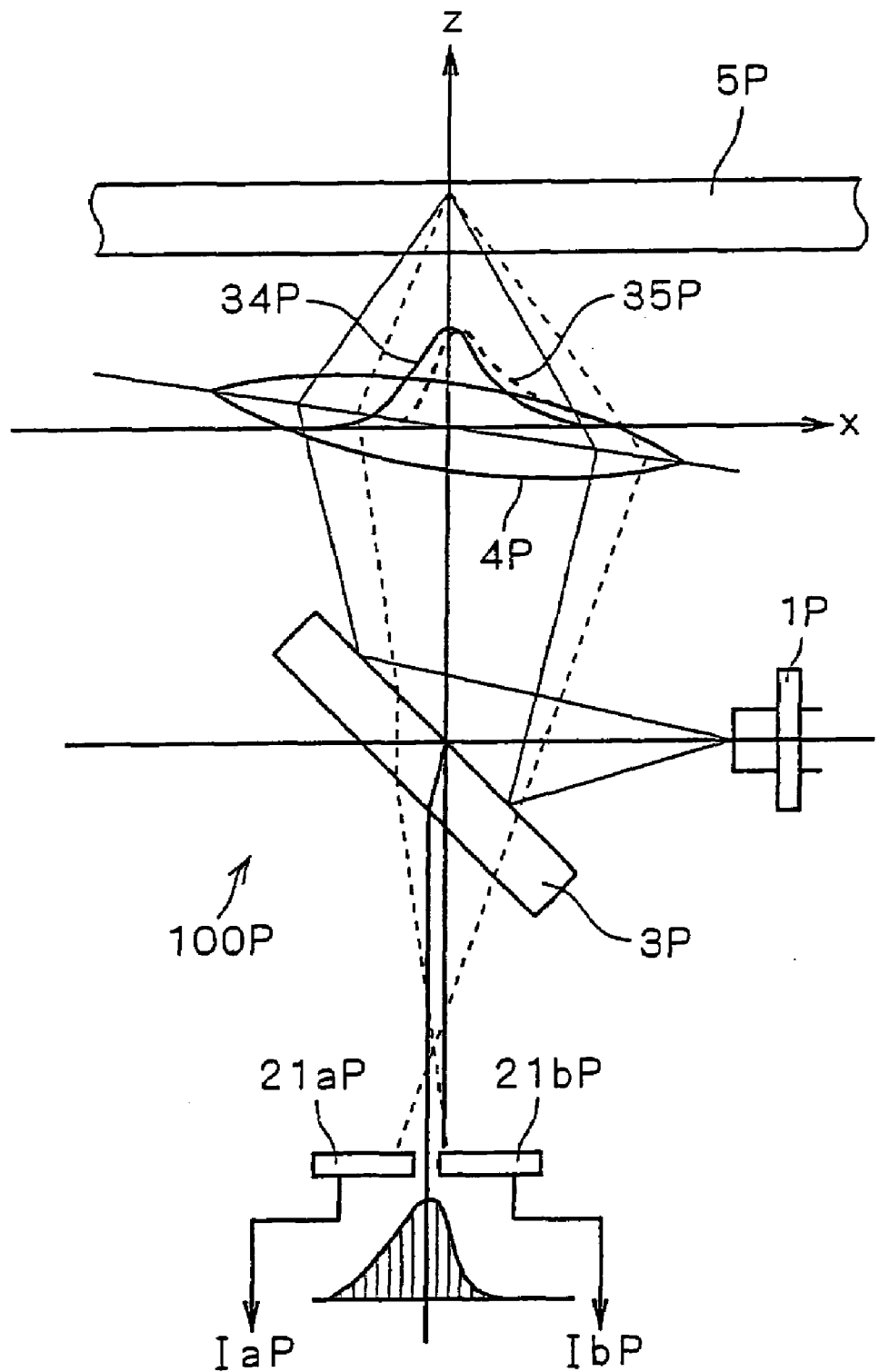

FIG. 14 is a schematic diagram for explaining a general structure of an optical head device 100E according to a third preferred embodiment, and FIG. 15 is a partial enlarged view of the optical head device 100E. The optical head device 100E (or an objective lens actuator 100c) is basically identical in configuration to the previously described optical head device 100C (or the objective lens actuator 100b) (cf. FIG. 11).

Especially in the optical head device 100E, the lens holder 101 has formed therein a generally cylindrical bearing hole 101a2 that has a straight-sided wall in longitudinal cross section. Between the wall around the bearing hole 101a2 and the support shaft 103, magnetic fluids 132 are provided. Further, permanent magnets 133 are fixedly mounted on the lens holder 101 to face the magnetic fluids 132 and the bearing hole 101a2. The permanent magnets 133 are, for example, cylindrical in shape and arranged to hold the bearing hole 101a2 therein. At this time, the permanent magnets 133 are buried, for example, in a plastic material which is the base material of the lens holder 101. Otherwise, the optical head device 100E is identical in configuration to the previously described optical head device 100C.

The optical head device 100E has magnetic fields that are produced, for example, by the magnets 114b directly or indirectly through the support shaft 103. Such magnetic fields allow stable holding of the magnetic fluids 132 (i.e., prevent scattering of the magnetic fluids 132). Accordingly, damping characteristics of the magnetic fluids 132 can be ensured longer than in the case of using non-magnetic fluids, which improves operational reliability. Especially the optical head device 100E can improve the stability of the magnetic fluids 132 being held by the permanent magnets 133, which makes the above effect more pronounced.

As the magnetic flux density of the magnetic fields applied to the magnetic fluids 132 becomes more uniform, the density variations of magnetic particles in the magnetic fluids 132 become smaller and consequently, the damping characteristics of the entire magnetic fluids 132 become more uniform. To make uniform the magnetic flux density in the bearing hole 101a2, the permanent magnets 133 should preferably be long along the direction in which the bearing hole 101a2 is formed (i.e., the cylindrical permanent magnets 133 are preferably of greater height).

Unlike the previously described optical head device 100 (cf. FIG. 1), the optical head device 100E has formed therein the generally cylindrical bearing hole 101a2; therefore, the amount of gap between the wall around the bearing hole 101a2 and the support shaft 103 varies depending on the amount of inclination (turning) of the lens holder 101. However, the damping effect of the magnetic fluids 132 allows stable operations with a minimum amount of variations in operating characteristics due to the presence or absence of the inclination of the lens holder 101. In this regard, the bearing hole 101a in the optical head device 100C having the fluids 131 (cf. FIG. 11), for example, may generally be cylindrical in shape; however, it is easier to form the bearing hole 101a2 that is straight-sided in cross section than to form the bearing hole 101a that is circularly arcuate in cross section.

While the invention has been shown and described in detail, the foregoing description is in all aspects illustrative and not restrictive. It is therefore understood that numerous modifications and variations can be devised without departing from the scope of the invention.

What is claimed is:

1. An optical head device comprising:
   an objective lens for bringing light emitted from a light source into focus on an information recording medium;
   a lens holder for holding said objective lens, said lens holder having a bearing hole formed along a direction parallel to an optical axis of said objective lens, the bearing hole is formed such that a shape from the bearing hole's bottom opening, through a center opening, to the bearing hole's top opening is a parabolic shape such that a diameter of the bearing hole's top opening and bottom opening are larger than the diameter of the center opening which is a distance between the bearing hole's top opening and bottom opening;
   a support shaft inserted in said bearing hole;
   a light detector for receiving said light reflected from said information recording medium and outputting information about inclination of said objective lens relative to said information recording medium on the basis of said light received; and
   an inclination drive unit for, according to said information about said inclination, turning said lens holder on a first axis perpendicular to said support shaft.

2. The optical head device according to claim 1, further comprising:
   a fluid provided in said bearing hole.

3. The optical head device according to claim 2, wherein said fluid includes a magnetic fluid.

4. The optical head device according to claim 3, wherein said lens holder further includes a permanent magnet located opposite said bearing hole and said magnetic fluid.

5. An optical head device comprising:
   an objective lens for bringing light emitted from a light source focus on an information recording medium;
   a lens holder for holding said objective lens, said lens holder having a bearing hole formed along a direction parallel to an optical axis of said objective lens, the bearing hole having a diameter that gradually increases while approaching the bearing hole's openings from the bearing hole's center;
   a support shaft inserted in said bearing hole;
   a light detector for receiving said light reflected from said information recording medium and outputting information about inclination of said objective lens relative to said information recording medium on the basis of said light received; and
   an inclination drive unit for, according to said information about said inclination, turning said lens holder on a first axis perpendicular to said support shaft, wherein
   said bearing hole has a wall that is generally circularly arcuate in cross-sectional shape.

6. The optical head device according to claim 5, wherein an equation $(A-B)-L \times \tan\theta$ is generally satisfied, where A is a hole diameter of said bearing hole in the vicinity of said opening, B is a hole diameter of said bearing hole in the vicinity of said center, L is a length of said bearing hole along said optical axis of said objective lens, and $\theta$ is a maximum amount of correction on the turning of said lens holder.

7. The optical head device according to claim 6, wherein said (A−B) equals approximately to 88 μm and said L equals approximately to 5 mm.

8. An optical head device comprising:
   an objective lens for bringing light emitted from a light source into focus on an information recording medium;
   a lens holder for holding said objective lens, said lens holder having a bearing hole formed along a direction parallel to an optical axis of said objective lens, the bearing hole having a diameter that gradually increases while approaching the bearing hole's openings from the bearing hole's center;
   a support shaft inserted in said bearing hole;
   a light detector for receiving said light reflected from said information recording medium and outputting information recording about inclination of said objective lens relative to said information recording medium on the basis of said light received; and
   an inclination drive unit for, according to said information about said inclination, turning said lens holder on a first axis perpendicular to said support shaft,
   wherein said inclination drive unit includes:

electromagnetic drive means comprising a first element mounted on said lens holder on a second axis perpendicular to both said support shaft and said first axis perpendicular to said support shaft, and a second element located opposite said first element; and a magnetic material fixedly mounted on said lens holder in close vicinity to said second element of said electromagnetic drive means.

9. An optical head device comprising:

an objective lens for bringing light emitted from a light source into focus on an information recording medium;

a lens holder for holding said objective lens, said lens holder having a bearing hole formed along a direction parallel to an optical axis of said objective lens, the bearing hole is formed such that a shape from the bearing hole's bottom opening, through a center opening, to the bearing hole's top opening is a parabolic shape such that a diameter of the bearing hole's top opening and bottom opening are larger than the diameter at the center opening which is a distance between the bearing hole's top opening and bottom opening;

a support shaft inserted in said bearing hole; and a fluid provided in said bearing hole.

10. The optical head device according to claim 9, wherein said fluid includes a magnetic fluid.

11. The optical head device according to claim 10, wherein said lens holder further includes a permanent magnet located opposite said bearing hole and said magnetic fluid.

* * * * *